United States Patent
Vincent et al.

(10) Patent No.: US 8,916,309 B2
(45) Date of Patent: Dec. 23, 2014

(54) PROTON-EXCHANGE MEMBRANE FUEL CELL HAVING ENHANCED PERFORMANCE

(75) Inventors: Remi Vincent, Grenoble (FR); Julien Tard, Saint Quentin Fallavier (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 13/985,303

(22) PCT Filed: Feb. 7, 2012

(86) PCT No.: PCT/EP2012/052070
§ 371 (c)(1),
(2), (4) Date: Sep. 18, 2013

(87) PCT Pub. No.: WO2012/110367
PCT Pub. Date: Aug. 23, 2012

(65) Prior Publication Data
US 2014/0011115 A1 Jan. 9, 2014

(30) Foreign Application Priority Data

Feb. 14, 2011 (FR) .................................... 11 51184

(51) Int. Cl.
*H01M 8/02* (2006.01)
*H01M 8/10* (2006.01)

(52) U.S. Cl.
CPC .......... *H01M 8/1004* (2013.01); *H01M 8/0202* (2013.01); *H01M 8/0271* (2013.01); *H01M 8/02* (2013.01); *H01M 8/028* (2013.01); *H01M 8/0206* (2013.01); *H01M 8/0221* (2013.01); *H01M 8/0228* (2013.01); *H01M 8/0234* (2013.01); *H01M 8/0239* (2013.01); *H01M 8/0245* (2013.01); *H01M 8/0297* (2013.01); *Y02E 60/50* (2013.01)
USPC ........................................... 429/483; 429/482

(58) Field of Classification Search
CPC ... H01M 8/02; H01M 8/0202; H01M 8/0271; H01M 8/028
USPC .................................................. 429/482, 483
See application file for complete search history.

(56) References Cited

U.S. PATENT DOCUMENTS

| | | | |
|---|---|---|---|
| 7,267,869 B2 | 9/2007 | Kriksunov | |
| 2006/0021544 A1 | 2/2006 | Kriksunov | |
| 2008/0113253 A1 | 5/2008 | Yagi et al. | |
| 2008/0248368 A1 | 10/2008 | Dadheech et al. | |
| 2009/0176139 A1* | 7/2009 | Abd Elhamid et al. | 429/30 |

FOREIGN PATENT DOCUMENTS

| | | |
|---|---|---|
| EP | 2234192 | 9/2010 |
| WO | WO2004/062020 | 7/2004 |
| WO | WO2005/101554 | 10/2005 |

* cited by examiner

*Primary Examiner* — Jonathan Jelsma
(74) *Attorney, Agent, or Firm* — Occhiuti & Rohlicek LLP

(57) ABSTRACT

A fuel-cell stack includes a proton-exchange membrane, a first electrode, a second electrode, a first current-collecting metal plate, a first gas diffusion layer, and first and second layers that contact each other. The first electrode and second electrodes are fixed on corresponding sides of the membrane. The first gas diffusion layer is interposed between the first current-collecting plate and the second electrode. The first layer is fixed on the first current-collecting plate, while the second layer is fixed to the first gas diffusion layer. Both layers include a polyurethane matrix containing conductive fillers. The second layer makes contact with the first layer.

13 Claims, 2 Drawing Sheets

PROTON-EXCHANGE MEMBRANE FUEL CELL HAVING ENHANCED PERFORMANCE

CROSS REFERENCE TO RELATED APPLICATION

This application is the national phase under 35 USC 371 of international application no. PCT/EP2012/052070, filed Feb. 7, 2012, which claims the benefit of the priority date of French application no. 1151184, filed Feb. 14, 2011. The contents of the aforementioned applications are incorporated herein in their entirety.

FIELD OF DISCLOSURE

The invention relates to fuel cell stacks, and in particular proton exchange membrane fuel cell stacks.

BACKGROUND

Fuel cell stacks are especially envisioned as a source of energy for future mass produced automotive vehicles. A fuel cell stack is an electrochemical device that converts chemical energy directly into electrical energy. A fuel cell stack comprises a stack of a number of cells in series. Each cell generates a voltage of about 1 volt, and stacking them allows a supply voltage of a higher level, for example of about one hundred volts, to be generated.

Among known types of fuel cell stacks, proton exchange membrane (PEM) fuel cell stacks may in particular be mentioned. Such fuel cell stacks have particularly advantageous compactness properties. Each cell comprises an electrolytic membrane that only lets protons pass, the passage of electrons being blocked. The membrane comprises an anode on a first side and a cathode on a second side.

At the anode, dihydrogen, used as fuel, is ionized to produce protons that pass through the membrane. The electrons produced by this reaction migrate toward a flow plate then flow through an electrical circuit external to the cell so as to form an electrical current. At the cathode, oxygen is reduced and reacts with the protons to form water.

The fuel cell stack may comprise a number of flow plates, for example made of metal, stacked on one another. The membrane electrode assembly (MEA) is placed between two flow plates. The flow plates may comprise channels and orifices for guiding reactants and products to/from the membrane. The plates are also electrically conductive in order to form collectors for collecting the electrons generated at the anode. Gas diffusion layers are interposed between the electrodes and the flow plates and make contact with the flow plates.

The flow plates make contact with very acidic solutions. On the cathode side, the plate is subjected to pressurized air in a highly oxidizing environment. On the anode side, the plate makes contact with hydrogen. Under such conditions, the metal plates corrode. Corrosion of a plate leads, on the one hand, to emission of metal ions that adversely affect the operation of the electrolytic membrane and, on the other hand, to formation of an insulating oxide layer on the metal, thereby increasing its contact resistance with respect to the gas diffusion layer. The electrical resistance between the plate and the gas diffusion layer is thus increased. These effects degrade the performance of the fuel cell stack.

The metal plates must therefore have a high electrical conductivity while not corroding or oxidizing. As most metals are subject to the same problems of oxidation and corrosion, a certain number of studies have proposed to form a protective coating on the metal plates in order to preserve the electrical conduction properties of the metal from which they are made while preventing oxidation reactions occurring on their surface.

In the document entitled "Deposition of gold-titanium and gold-nickel coatings on electropolished 316L stainless steel bipolar plates for proton exchange membrane fuel cells" published in the International Journal of Hydrogen Energy, 2010, Vol. 35, No. 4, pp. 1713-1718, the metal plates were in particular coated with gold. Thus, the contact resistance between a plate and a gas diffusion layer was reduced. However, the cost of gold and its deposition process make such a solution impractical for mass production.

Document US 2008/248368 describes a fuel cell stack equipped with a separating collecting plate covered with a hydrophilic layer including a polyurethane matrix. A gas diffusion layer is covered with a hydrophobic layer made of polytetrafluoroethylene.

U.S. Pat. No. 7,267,869 proposes to form a protective layer on metal plates by depositing a polymer-based ink containing a carbon particle filler. The purpose of the carbon particles is to improve conduction between the gas diffusion layer and the metal plate.

SUMMARY

However, it would be desirable to further improve conduction between the gas diffusion layer and the metal plate while using materials and processes that can be exploited on an industrial scale.

The invention thus relates to a fuel cell stack, comprising:
a proton exchange membrane;
a first electrode and a second electrode fixed on either side of the proton exchange membrane;
a current collecting metal plate;
a gas diffusion layer interposed between the current collecting plate and the second electrode;
a first layer fixed on the current collecting plate, the first layer comprising a polyurethane matrix containing conductive fillers; and
a second layer fixed to the gas diffusion layer, the second layer comprising a polyurethane matrix containing conductive fillers, the second layer making contact with the first layer.

According to one variant, the fuel cell stack furthermore comprises:
another current collecting metal plate;
another gas diffusion layer interposed between the other current collecting plate and the first electrode;
a third layer fixed on the other current collecting plate, the third layer comprising a polyurethane matrix containing conductive fillers; and
a fourth layer fixed on the other gas diffusion layer, the fourth layer comprising a polyurethane matrix containing conductive fillers, the fourth layer making contact with the third layer.

According to another variant, the polyurethane matrix of the first and second layers is obtained using a diisocyanate curing agent.

According to another variant, said curing agent is chosen from the group comprising hexylene diisocyanate, toluene diisocyanate and diphenylmethane diisocyanate.

According to another variant, the conductive fillers contained in the first and second layers comprise carbon particles.

According to another variant, the carbon particles are particles of carbon black having a particle size between 200 and 500 nm as measured by syringe filter.

According to another variant, the surfaces that make contact of the first and second layers have a roughness of less than 1 micron.

According to another variant, the gas diffusion layer is formed from graphite fibers.

According to another variant, the first layer comprises an alternation of grooves and protruding parts and the second layer comprises through-windows facing the grooves.

The invention also relates to a process for manufacturing a fuel cell stack comprising a proton exchange membrane, a first electrode and a second electrode which are fixed on either side of the proton exchange membrane, a current collecting metal plate, and a gas diffusion layer interposed between the current collecting plate and the second electrode, the process comprising steps of:

forming a first layer with a polyurethane matrix containing conductive fillers on the current collecting plate;

forming a second layer with a polyurethane matrix containing conductive fillers on the gas diffusion layer; and bringing the first and second layers formed into contact.

According to one variant, the steps of forming the first and second layers include crosslinking a polyurethane matrix using a diisocyanate curing agent.

BRIEF DESCRIPTION OF THE FIGURES

Other features and advantages of the invention will become clearly apparent from the completely nonlimiting description given below by way of illustration and with reference to the appended drawings, in which.

DETAILED DESCRIPTION

The invention provides a fuel cell stack comprising a proton exchange membrane (120). Electrodes are fixed on either side of the membrane. The fuel cell stack also comprises a current collecting metal plate and a gas diffusion layer interposed between the current collecting plate and one of the electrodes. A first layer is fixed to the current collecting plate and comprises a polyurethane matrix containing conductive fillers. A second layer is fixed to the gas diffusion layer and comprises a polyurethane matrix containing conductive fillers. The first and second layers make contact.

The invention makes it possible to obtain both a good electrical conduction through the layers fixed respectively to the guiding plate and to the gas diffusion layer, to ensure a low contact resistance between the guiding plate and the gas diffusion layer, to protect the guiding plate from corrosion and to use materials the cost of which is compatible with mass production.

Figure 1:
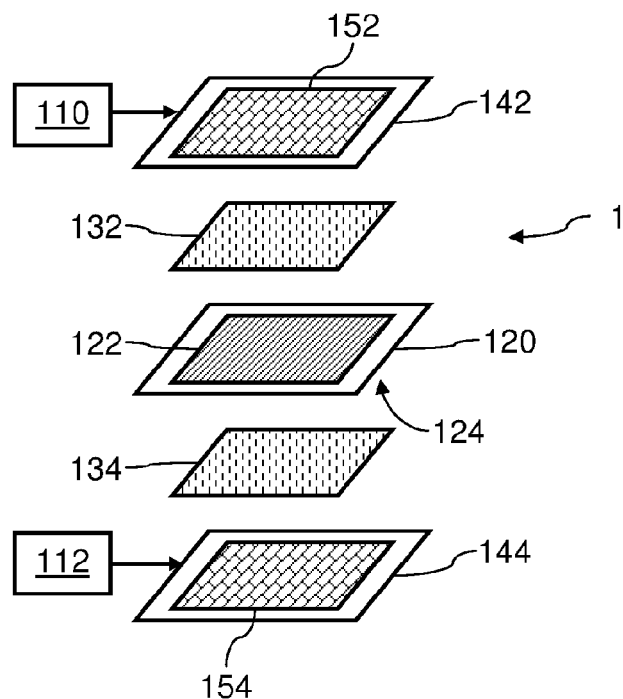
FIG. 1 is an exploded schematic perspective view of a cell of a fuel cell stack according to one embodiment of the invention.

FIG. 1 is an exploded schematic perspective view of a cell 1 of a fuel cell stack according to one embodiment of the invention. The cell 1 is a cell of the proton exchange membrane or polymer electrolyte membrane type. The cell 1 of the fuel cell stack comprises a fuel source 110 that supplies an inlet of the cell with dihydrogen. The cell 1 also comprises an air source 112 supplying an inlet of the cell with oxygen-containing air used as an oxidant. The cell 1 also comprises exhaust channels (not shown). The cell 1 may also comprise a cooling circuit (not shown).

The cell 1 comprises an electrolyte layer 120 formed for example by a polymer membrane. The cell 1 also comprises an anode 122 and a cathode 124 placed on either side of the electrolyte 120 and fixed to the electrolyte 120. The cell 1 contains flow-guiding plates 142 and 144 placed facing the anode 122 and the cathode 124, respectively. In addition the cell 1 also contains a gas diffusion layer 132 placed between the anode 122 and the guiding plate 142. The cell 1 moreover contains a gas diffusion layer 134 placed between the cathode 124 and the guiding plate 144.

Figure 2:
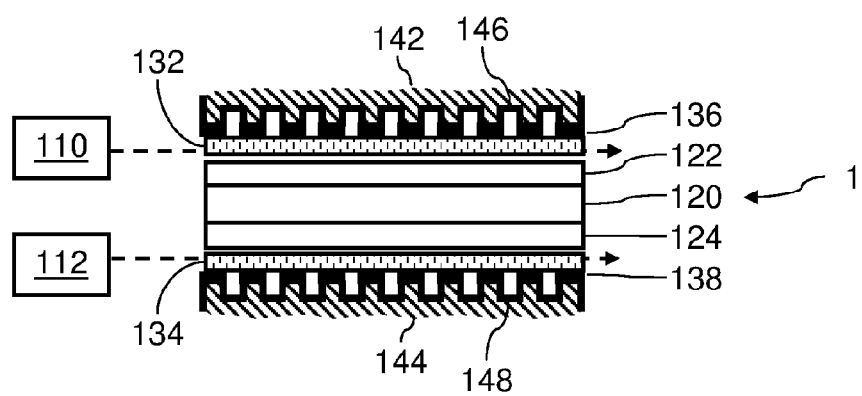
FIG. 2 is a cross-sectional view of the cell in FIG. 1.

FIG. 2 is a schematic cross-sectional view of the cell 1 of the fuel cell stack according to the embodiment of the invention.

The electrolyte layer 120 forms a semipermeable membrane allowing proton conduction while being impermeable to the gases present in the cell. The electrolyte layer 120 also prevents passage of electrons between the anode 122 and the cathode 124.

The anode 122 generally comprises a catalyst layer including, for example, a catalyst such as carbon-supported platinum, and a protonically conductive ionomer such as, for example, the product marketed under the trade name Nafion. Platinum is used for its catalytic properties.

The cathode 124 generally comprises a catalyst layer including, for example, platinum fixed to a carbon support and a protonically conductive ionomer. Platinum is used for its catalytic properties.

The gas diffusion layer 132 serves to diffuse dihydrogen from a flow channel of the plate 142 to the anode 122.

The gas diffusion layer 134 serves to diffuse air from a flow channel of the plate 144 to the cathode 124.

The gas diffusion layers 132 and 134 may, for example, be produced in a way known per se from a graphite woven or felt or fibers on which a hydrophobic agent such as polytetrafluoroethylene is fixed.

The plates 142 and 144 are produced from a metal such as stainless steel in a way known per se. The plates 142 and 144 are usually denoted "bipolar plates", a given component generally comprising a guiding plate 142 belonging to a cell and a guiding plate 144 belonging to an adjacent cell. The plates 142 and 144 are conductive and allow the current generated by the cell 1 to be collected. The plates 142 and 144 comprise sides, oriented toward the electrolyte layer 120, comprising zones 152 and 154, respectively, comprising an array of grooves or channels. These zones 152 and 154 comprising the grooves or channels allowing dihydrogen and air, respectively, to be conveyed to the interior of the cell 1.

During operation of the fuel cell stack, air flows between the electrolyte 120 and the plate 144, and dihydrogen flows between the electrolyte 120 and the plate 142. At the anode 122, the dihydrogen is oxidized to produce protons that pass through the electrolyte 120. The electrons produced by this reaction are collected by the plate 142 and applied to an electrical load connected to the cell 1 thereby forming an electrical current. At the cathode 124, oxygen is reduced and reacts with the protons to form water. The following reactions occur at the anode and cathode:

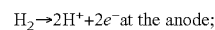

$H_2 \rightarrow 2H^+ + 2e^-$ at the anode;

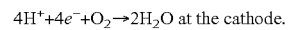

$4H^+ + 4e^- + O_2 \rightarrow 2H_2O$ at the cathode.

During its operation, a cell 1 usually generates a DC voltage between the anode and cathode of about 1 V.

Figure 3:
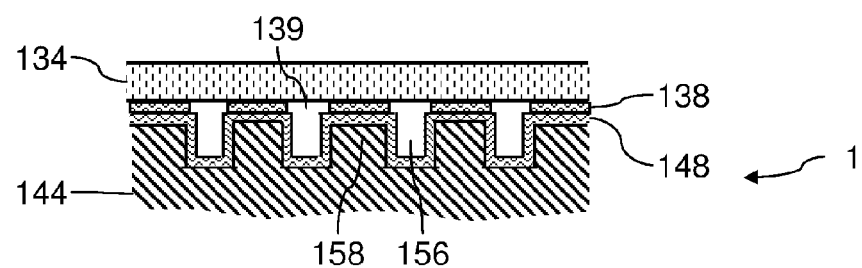
FIG. 3 is an enlarged view of details of FIG. 2.

As illustrated in FIGS. 2 and 3, a layer 148 is fixed to the plate 144. A layer 138 is moreover fixed to the gas diffusion layer 134. The presence of a layer 138 on the diffusion layer 134 contradicts the received idea that optimal performance is obtained for the cell 1 by removing any additional element liable to degrade its permeability to gas. Moreover, the presence of a layer 138 having a low porosity in practice only slightly degrades the permeability of the diffusion layer 134 to gas, due to the presence of the windows 139 described below. The layers 138 and 148 make contact.

The layer 148 is intended to protect the plate 144 from corrosion and is intended to reduce contact resistance with respect to the gas diffusion layer 134. The layer 148 is also intended to have a low resistance with regard to the electrical current flowing through it. The layer 148 comprises a polyurethane-based matrix especially intended to provide it with strength. The matrix contains conductive fillers. Thus, the conductive fillers make the layer 148 conductive. It has been observed that such a matrix allows a very low roughness to be obtained in the contact zones of the layer 148. The inventors have observed that this low roughness allows the contact resistance with respect to the gas diffusion layer 134 to be reduced while ensuring satisfactory protection of the plate 144. Advantageously, the roughness of the contact zones of the layer 148 is lower than 1 μm.

The layer 138 is intended to reduce the contact resistance with respect to the plate 144 and to promote diffusion of gas toward the cathode 124. The layer 138 is also intended to have a low resistance with regard to the electrical current flowing through it. The layer 138 comprises a polyurethane-based matrix especially intended to provide it with strength. The matrix contains conductive fillers. Thus, the conductive fillers make the layer 138 conductive. It has been observed that such a matrix allows a very low roughness to be obtained in the contact zones of the layer 138. The roughness of the layer 138 is in particular very much lower than the roughness of the diffusion layer 134. The inventors have observed that this low roughness allows the contact resistance with respect to the plate 144 to be reduced. Advantageously, the roughness of the contact zones of the layer 138 is lower than 1 μm.

Such a polyurethane matrix allows particularly smooth and uniform layers 138 and 148 to be formed. The very low roughness and the similarity in the roughnesses of the zones of the layers 138 and 148 placed in contact allow a very low contact resistance to be obtained between the diffusion layer 134 and the plate 144. The layers 138 and 148 are advantageously between 5 and 20 μm in thickness. The proportion of the matrix by weight in the layer 138 is advantageously between 20 and 70%.

Advantageously, the conductive fillers contained in the layers 138 and 148 are carbon black. The carbon black advantageously has a particle size between 200 and 500 nm as measured by syringe filter. The proportion of the fillers by weight in the layer 138 is advantageously between 20 and 60%. A sufficient proportion of carbon black is used to obtain an advantageous percolation effect in the matrix.

The polyurethane matrix is advantageously produced using a diisocyanate curing agent. Thus a curing agent such as hexylene diisocyanate, toluene diisocyanate or diphenylmethane diisocyanate may be used.

Associating a polyurethane matrix, a diisocyanate curing agent and carbon black fillers has allowed in practice layers 138 and 148 to be obtained that are very smooth with a uniform distribution of the fillers. Thus, the repulsion between fillers is not too great thereby preventing porous layers 138 and 148 from forming. The attraction between the fillers is also not too great thereby preventing agglomerates of particles from forming in the layers 138 and 148.

The plate 144 and the layer 148 comprise an alternation of protruding parts 158 and grooves 156. The grooves 156 are for example formed with a pitch between 1 and 2 mm. The layer 138 comprises through-windows 139 placed facing the grooves 156. The windows 139 thus allow gas to pass through the diffusion layer 134. The rest of the layer 138 makes contact with the protruding parts 158 of the layer 148.

The layers 138 and 148 may be formed on the layer 134 and on the plate 144, respectively, by various processes known per se by those skilled in the art, such as screen printing or spraying a composition taking the form of an ink. The layers 138 and 148 may also be cured before being added by transfer to the layer 134 and the plate 144, respectively.

Apart from the polymer matrix, the curing agent and the conductive fillers, the ink used may also comprise an (anionic or ionic) surfactant intended to stabilize the conductive fillers in the liquid matrix. The layer 138 may comprise between 7 and 20 wt % surfactant.

The ink may have a solid content of between 1 and 40% depending on the process used to form the layers 138 and 148.

The following is a first example of a possible ink composition:

3.9 parts by weight of the product sold by Bayer under the trade name Bayhydrol UXP2239;

2.4 parts by weight of the product sold by Bayer under the trade name Bayhudrur BL5335;

2.1 parts by weight of the carbon black sold by Bayer under the trade name Vulcan XC-72;

0.7 parts by weight of the surfactant sold by Bayer under the trade name Triton X-100; and 91 parts by weight distilled water.

The following is a second example of a possible ink composition:

2.6 parts by weight of the product sold by Bayer under the trade name Bayhydrol UXP2239;

1.6 parts by weight of the product sold by Bayer under the trade name Bayhudrur BL5335;

2.7 parts by weight of the graphite powder sold under the trade name Timrex KS6;

0.9 parts by weight of the surfactant sold by Bayer under the trade name Triton X-100; and 92.3 parts by weight distilled water.

The layers 136 and 146 may have a similar structure and properties to the layers 138 and 148. The plate 142 and the diffusion layer 132 may also have a similar structure and properties to the plate 144 and the diffusion layer 134.

Figure 4:
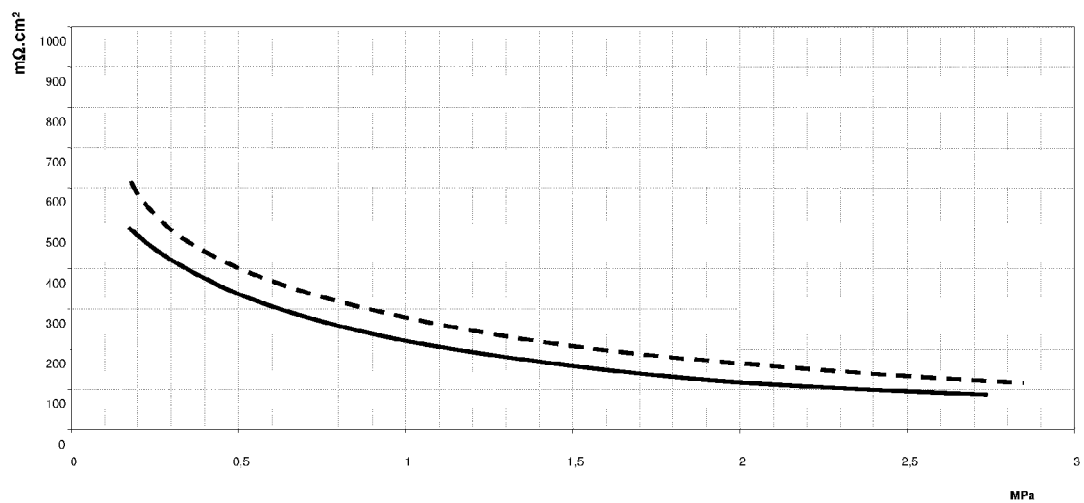
FIG. 4 is a comparative graph of the contact resistivity between a gas conducting layer and a guiding plate.

FIG. 4 is a graph illustrating the contact resistivity between a plate 144 and a diffusion layer 134 as a function of the contact pressure between them. The solid curve illustrates the resistivity of the embodiment described previously. The dashed-line curve illustrates the resistivity with the same plate 144 but with a diffusion layer 134 without a layer 138. It will be noted, for example, that for a pressure of 1 MPa, the contact resistivity of the embodiment of the invention is 25% lower.

The invention claimed is:

1. An apparatus comprising a fuel cell stack, said fuel-cell stack comprising a proton-exchange membrane, a first electrode, a second electrode, a first current-collecting metal plate, a first gas diffusion layer, a first layer, and a second layer, wherein said first electrode is fixed on a first side of said proton-exchange membrane, wherein said second electrode is fixed on a second side of said proton-exchange membrane, wherein said first gas diffusion layer is interposed between said first current-collecting plate and said second electrode, wherein said first layer is fixed on said first current-collecting plate, wherein said second layer is fixed to said first gas diffusion layer, wherein said first layer comprises a polyurethane matrix containing conductive fillers, wherein said second layer comprising a polyurethane matrix containing conductive fillers, and wherein said second layer makes contact with said first layer.

2. The apparatus of claim 1, wherein said fuel-cell stack further comprises a second current collecting metal plate, a second gas diffusion layer, a third layer, and a fourth layer, wherein said second gas diffusion layer is interposed between said second current collecting plate and said first electrode, wherein said third layer is fixed on said second current collecting plate, wherein said third layer comprises a polyurethane matrix containing conductive fillers, wherein said fourth layer is fixed on said second gas diffusion layer, wherein said fourth layer comprises a polyurethane matrix containing conductive fillers, and wherein said fourth layer makes contact with said third layer.

3. The apparatus of claim 1, wherein said polyurethane matrix of said first layer is obtained using a diisocyanate curing agent, and wherein said polyurethane matrix of said second layer is obtained using said diisocyanate curing agent.

4. The apparatus of claim 3, wherein said diisocyanate curing agent comprises hexylene diisocyanate.

5. The apparatus of claim 3, wherein said diisocyanate curing agent comprises toluene diisocyanate.

6. The apparatus of claim 3, wherein said diisocyanate curing agent comprises diphenylmethane diisocyanate.

7. The apparatus of claim 1, wherein said conductive fillers contained in said first layer comprise carbon particles, and wherein said conductive fillers contained in said second layer comprises carbon particles.

8. The apparatus of claim 5, wherein said carbon particles comprise particles of carbon black having a particle size between 200 and 500 nanometers as measured by a syringe filter.

9. The apparatus of claim 1, wherein said first and second surfaces have a roughness of less than 1 micron.

10. The apparatus of claim 1, wherein said gas diffusion layer comprises graphite fibers.

11. The apparatus of claim 1, wherein said first layer comprises alternating grooves and protruding parts, and wherein said second layer comprises through-windows facing said grooves.

12. A process comprising manufacturing a fuel-cell stack comprising a proton-exchange membrane, a first electrode, a second electrode, and a gas diffusion layer, wherein said first electrode is fixed to a first side of said proton-exchange membrane, wherein said second electrode is fixed to a second side of said proton exchange membrane, and wherein said gas-diffusion layer is interposed between said current-collecting plate and said second electrode, wherein manufacturing said fuel-cell stack comprises forming a first layer on said current-collecting plate, said first layer having a polyurethane matrix containing conductive fillers, forming a second layer on said gas diffusion layer, said second layer having a polyurethane matrix containing conductive fillers, and bringing said first layer and said second layer into contact with each other.

13. The process of claim 12, wherein forming said first and second layers comprises crosslinking a polyurethane matrix using a diisocyanate curing agent.

* * * * *